(12) United States Patent
Hejduk

(10) Patent No.: US 12,709,317 B2
(45) Date of Patent: Aug. 18, 2026

(54) PRAM

(71) Applicant: CYBEX GmbH, Bayreuth (DE)

(72) Inventor: Jiri Hejduk, Zlatniky-Hodkovice (CZ)

(73) Assignee: CYBEX GmbH, Bayreuth (DE)

( * ) Notice: Subject to any disclaimer, the term of this patent is extended or adjusted under 35 U.S.C. 154(b) by 1010 days.

(21) Appl. No.: 17/597,651

(22) PCT Filed: Jul. 16, 2020

(86) PCT No.: PCT/EP2020/070147
§ 371 (c)(1),
(2) Date: Jan. 15, 2022

(87) PCT Pub. No.: WO2021/009286
PCT Pub. Date: Jan. 21, 2021

(65) Prior Publication Data

US 2022/0274638 A1 Sep. 1, 2022

(30) Foreign Application Priority Data

Jul. 16, 2019 (DE) ..................... 20 2019 002 988.5

(51) Int. Cl.
*B62B 9/20* (2006.01)
*B62B 5/00* (2006.01)
*B62B 7/06* (2006.01)

(52) U.S. Cl.
CPC .............. *B62B 9/20* (2013.01); *B62B 5/0033* (2013.01); *B62B 5/0073* (2013.01); *B62B 7/06* (2013.01)

(58) Field of Classification Search
CPC ... B62B 5/0033; B62B 5/0059; B62B 5/0069; B62B 5/0073; B62B 5/06; B62B 5/065;
(Continued)

(56) References Cited

U.S. PATENT DOCUMENTS

2015/0066274 A1 3/2015 Hijikata
2017/0001656 A1* 1/2017 Katayama ................ A61H 3/04
(Continued)

FOREIGN PATENT DOCUMENTS

CN 105172868 A 12/2015
CN 108032895 A 5/2018
(Continued)

OTHER PUBLICATIONS

Ma W, CN-108482470-A, Sep. 4, 2018 (Year: 2018).*
(Continued)

*Primary Examiner* — Valentin Neacsu
*Assistant Examiner* — Abigail R Hymel
(74) *Attorney, Agent, or Firm* — Schwegman Lundberg & Woessner, P.A.

(57) ABSTRACT

The invention relates to a pram or pram frame comprising a pusher bar for pushing the pram or pram frame and at least one force sensor device for detecting a direction or a magnitude of a force or a force component acting on the pusher bar and for detecting a variable derived from said force or force component, in particular a change in the force or force component over time, wherein the at least one force sensor device is designed to measure a force (component) or a variable derived therefrom at least over a vast majority of a horizontal section of the pusher bar, and is designed to measure a force (component) or a variable derived therefrom in at least one, in particular curved or arcuate, transition section of the pusher bar between the horizontal section of the pusher bar and a connecting section of the pusher bar.

12 Claims, 7 Drawing Sheets

(58) Field of Classification Search

CPC ........... B62B 5/069; B62B 5/08; B62B 5/082; B62B 7/00; B62B 7/06; B62B 9/00; B62B 9/10; B62B 9/20

See application file for complete search history.

(56) References Cited

U.S. PATENT DOCUMENTS

| | | | | |
|---|---|---|---|---|
| 2017/0326019 | A1* | 11/2017 | Bramsiepe | B62B 5/064 |
| 2018/0118245 | A1* | 5/2018 | Chung | B62B 5/0043 |
| 2018/0354539 | A1* | 12/2018 | Casey | B62B 5/0033 |
| 2018/0370553 | A1* | 12/2018 | Jones | B62B 3/1468 |

FOREIGN PATENT DOCUMENTS

| | | | |
|---|---|---|---|
| CN | 108791459 | A | 11/2018 |
| CN | 210478798 | U | 5/2020 |
| DE | 102011114337 | A1 | 3/2013 |
| DE | 102013224885 | A1 | 6/2015 |
| DE | 202017104166 | U1 | 10/2018 |
| JP | 5814102 | B2 | 10/2015 |
| JP | 2017052468 | | 3/2017 |
| KR | 101577142 | B1 | 12/2015 |
| WO | WO-2021009286 | A1 | 1/2021 |

OTHER PUBLICATIONS

Feng Z, CN-108275189-A, Jul. 13, 2018 (Year: 2018).*

Asano J, WO-2017042958-A1, Mar. 16, 2017 (Year: 2017).*

"International Application No. PCT/EP2020/070147, International Preliminary Report on Patentability mailed Jan. 27, 2022", (w/ English Translation), 9 pgs.

"Chinese Application 202080061747.1, Notification of the First Office Action dated Sep. 11, 2023", (Sep. 11, 2023), 19 pgs.

"International Application No. PCT/EP2020/070147, International Search Report and Written Opinion mailed Oct. 12, 2020", (Oct. 12, 2020), 13 pgs.

"Korean Application No. 10-2022-7005000, Office Action dated Jun. 26, 2025", w English Translation, (Jun. 26, 2025), 21 pgs.

* cited by examiner 141
120
134
133
134
121
138
132
131
105
140
122,139
110
111
135
105

101
140
133
104
136
135
132
131
103
102

PRAM

PRIORITY CLAIM TO RELATED APPLICATIONS

This application is a U.S. national stage filing under 35 U.S.C. § 371 from International Application No. PCT/EP2020/070147, filed on 16 Jul. 2020, and published as WO2021/009286 on 21 Jan. 2021, which claims the benefit under 35 U.S.C. 119 to German Application No. 20 2019 002 988.5, filed on 16 Jul. 2019, the benefit of priority of each of which is claimed herein, and which applications and publication are hereby incorporated herein by reference in their entirety.

The invention relates to a pram frame and a corresponding pram, in particular with motor assistance.

Motorized prams are known in principle. These can be configured in such a way that they can be moved exclusively by motor power. Furthermore, it is known in principle to equip prams with motor assistance that supports the driving force of a person operating the pram, but does not provide assistance if no force is exerted by the operator.

It is the object of the invention to propose a pram frame which is simple to operate, requires little effort and is robust, in particular a motorized pram frame, as well as a corresponding pram which, in particular, allows the person operating the pram to control the pram in a simple, comfortable and precise manner.

This object is solved in particular by a pram or a pram frame or a corresponding method according to enclosed claims (in each case individually or in combination). Further aspects of the invention, which are optionally also independent, can be taken from the following description.

The invention includes a sensor unit disposed in a handle area of a pusher bar for determining an external force acting on the pusher bar.

According to the invention, it may be optionally possible to determine whether or not a person is gripping the handle area of the pushchair. Preferably, however, forces (or a parameter related thereto) are measured, on the basis of which an engagement of an assisting drive for the wheels of the pram can be controlled.

A non-capacitive measurement method is preferred, since persons wearing gloves due to the weather, for example, can only be detected with difficulty by capacitive sensors.

The pusher bar is preferably provided with a sensor system that makes it possible to determine a force (or a parameter related thereto or derived therefrom) with which the pram is pushed or pulled, in particular using the smallest possible number of sensors.

Preferably, the sensor system is integrated into the pusher bar of the pram in such a way that the pusher bar is designed to be sensitive over a predominant part of the width or the entire width of the pusher bar and/or in a transition region between (approximately) horizontal sections and connecting sections of the pusher bar (optionally extending in the direction of a main body of the pram (frame)) (especially at corners and/or curves of the pusher bar).

It is also an object of the invention to propose a simple, safe, precise and/or cost-effective alternative to the solutions known from the prior art.

In particular, the invention relates to a pram or a frame of a pram, preferably comprising one or more wheels (preferably three or four wheels), a pusher bar having at least one handle area, and at least one sensor device. The pram or the frame may further comprise one or more front wheel struts, rear wheel struts and/or a child-receiving device or adapters for attaching a child-receiving device, respectively. The pram or frame may also include a motor and, optionally, a control device for the motor. Further designs are possible.

The pusher bar can have one or more approximately horizontal sections (hereinafter: horizontal sections), wherein an angle between the horizontal section and the horizontal can be smaller than 30°, preferably smaller than 15°, in particular also smaller than 5° or exactly 0°. The pusher bar may further comprise one or more sections extending (in each case) in (at least approximately) vertical planes for connection to further frame elements (hereinafter: connecting sections).

The pusher bar can be circumferential, i.e., for example, in the form of an (inverted) U, having a horizontal section and two lateral connecting sections (at least approximately) parallel to one another, wherein the handle area(s) are located at least in sections in the horizontal section. Alternatively, the pusher bar can also be in two parts, namely in the form of two (at least approximately) walking-stick-shaped and/or crutch-shaped elements, wherein the handle areas of the pusher bar are located in the upper, curved regions (comprising the horizontal sections) of the elements. Other embodiments, for example with only one central connecting section, are possible. If in the following an (at least approximately) U-shaped pusher bar is assumed, a transfer to other pusher bar shapes is possible and shall be included, unless otherwise stated. Likewise, statements regarding the handle area are to be understood as referring to any handle area that may be present.

An independent or further aspect of the invention is that forces acting on the pusher bar from the outside are measured or determined directly (directly) in the handle area of the pusher bar (i.e., not in/at a connecting section, for example).

The pusher bar is preferably designed in several parts in the handle area. In particular, the pusher bar has a (particularly dimensionally stable) base part, at least one sensor unit (preferably two sensor units), and at least one (particularly dimensionally stable) sheathing part that at least partially encloses the base part and the sensor unit in the handle area of the pusher bar.

According to the embodiment, an intermediate space is provided between the base part and the sheathing part, which allows the sheathing part to move (at least minimally) relative to the base part when external force is applied. In the absence of external force, the base part and sheathing part should preferably not be in direct contact (although this is possible, for example, if flexible sections are present).

According to the embodiment, the sensor unit is attached to the base part and to the sheathing part (force-conducting and/or rigid), with the sensor unit preferably being arranged between the base part and the sheathing part.

Preferably, the sensor unit comprises at least one force sensor, such as a strain gauge, which allows determining the amount of force along at least one sensitive axis applied to the sheathing part by a user.

Preferably, the connection(s) formed via the sensor unit(s) is/are the only (force-transmitting) connection between the base part and the sheathing part, so that any external force acting on the sheathing part is transmitted via the sensor unit to the base part (insofar as it does not perform work directly in the sheathing part, for example, deformation work).

It is conceivable that the base part and sheathing part are surrounded by a cover, for example made of leather or textile. However, such a cover will not transmit forces between the two parts, or only to a comparatively small extent, and therefore does not necessarily conflict with the preferred design of not providing any (force-transmitting) connection apart from the sensor unit.

Pushing or pulling the pram in a handle area of the pusher bar preferably causes the base part and the sheathing part to be (minimally) displaced relative to each other. The displacement of both parts preferably results in a change of an electrical parameter (e.g. voltage and/or resistance change, depending on the sensor design) in the sensor unit. The change in the electrical parameter can be transmitted to a/the control unit by means of a transmission device (e.g. by cable or by radio), whereby, depending on the displacement and the applied force, a motor power can be determined which is applied to support the wheels of the pram. The pram can thus be supported by an auxiliary drive depending on the external force applied.

The handle area of the pusher bar should preferably be predominantly (over at least 50% or at least 80% of its extension, in particular in a longitudinal direction), optionally everywhere, sensitive to forces acting on the pusher bar from outside.

In addition to the horizontal section (or multiple thereof), a transition region between the horizontal section(s) and the connecting section(s) can be designed in a sensitive manner. This is achieved by the base part being at least partially surrounded in the rounding areas by (optionally separate) rounding sheathing parts.

The respective sheathing part, in particular rounding sheathing part, can for example be manufactured (inexpensively) from plastic, optionally monolithically in each case, but preferably in two or more parts. In particular, it is conceivable that the respective sheathing part, in particular rounding sheathing part, can be (partially) manufactured by injection molding and/or with a 3D printer.

An (or the above) intermediate space may be provided between the rounding sheathing part and the base part so that the rounding sheathing part and the base part can move relative to each other when a user grasps/grips the pram, for example, in the rounding area of the pusher bar and applies a pulling or pushing force to the pusher bar of the pram.

The rounding sheathing part preferably has a first projection on a side facing the sensor unit, which extends in the space between the base part and the sheathing part. In accordance with the embodiment, a force causing a movement (displacement) between the rounding sheathing part and the base part is transmitted (mechanically) to the sensor unit by the first projection of the rounding sheathing part, so that the handle area of the pusher bar in the rounding area is also sensitive.

Preferably, the first projection of the rounding sheathing part is part of the (possibly only) connection between the base part and the sheathing part, so that a connection between the base part, sheathing part, rounding sheathing part and sensor is provided (exclusively) via said first projection. However, the sensor unit can be fastened to the base part at further points, in particular screwed to it.

Preferably, the rounding sheathing part has an edge region, in particular an edge, with which it is directly adjacent, preferably positively adjacent, to the sheathing part. In particular, the edge region may have third projections for cooperating with corresponding recesses in the sheathing part.

In a specific design, the respective sheathing part, in particular rounding sheathing part, can have two shell halves which can be joined together in such a way that they can sheathe the base part in a transition region between the horizontal and connecting sections. The connection between the two shell halves can be made by material closure (e.g. gluing)—but preferably the connection should be detachable and made by a latching, snapping, and/or screwing mechanism. For this purpose, one of the two shell halves may have a second projection projecting into the receiving space, via which the connection to the other shell half is established. The second projection may have (support) a latching or snapping mechanism that can cooperate with a corresponding counterpart on the inside of the other shell, and/or it may have an internal thread that can cooperate with a screw passed through a corresponding opening provided in the other shell half. In any case, an opening (channel) may be provided in the base part, dimensioned (at least slightly) larger (in diameter) than the second projection, in order to avoid an unwanted connection between the rounding sheathing part and the base part.

In a preferred embodiment, two sensor units are integrated in the pusher bar. The sensor units are positioned adjacent to the ends of the horizontal section (at a distance of less than 5 cm or less than 3 cm or less than 1 cm), i.e. close to the connecting sections.

At least one sensor unit is installed, preferably two sensor units (on the left and right side of the pusher bar, symmetrically). The detection direction of the sensor unit can be inclined forward downward by an inclination angle of 0° to 45°, preferably 3° to 20°. e.g. (at least about) 8° with respect to the horizontal. By means of an inclination of the sensor unit, an upwardly or downwardly directed force component can also be detected, so that in case of need (e.g. if the front wheels are lifted by a force acting downwardly on the pusher bar) an assistance drive by the motor may not be permitted.

In the specific dimensioning of the sheathing part or rounding sheathing part, a (preferably constant) intermediate space is provided between the (dimensionally stable) base part and the sheathing part or rounding sheathing part of preferably 0.1 mm to 5 mm, further preferably 0.5 mm to 2 mm. e.g. approx. 1 mm.

The force threshold at which the auxiliary drive intervenes can be between 30N and 7N, in particular between 25N and 10N, preferably (at least approx.) 15N. The sampling rate of the sensor unit can be greater than 5 Hz, in particular greater than or equal to 10 Hz. The sampling rate can further be less than 1 kHz or less than 100 Hz. Preferably, no hysteresis is provided for the force threshold.

In addition to strain gauges, capacitive and/or inductive sensor technology can also be used to detect the displacements between the base part and the sheathing part(s) (and rounding sheathing part(s)) by means of sensors. Several sections that can be displaced against each other would also be conceivable.

Alternatively to the described embodiment with separate rounding sheathing parts, other divisions of the sheathing (comprising or consisting of sheathing part(s) and/or rounding sheathing part(s)) can also be provided. In particular, the entire sheathing may comprise (at least) two parts, neither of which constitutes a sheathing on its own, but in which the sheathing is formed only by the joining of the (at least) two parts. In particular, two half-shells, for example an upper shell and a lower shell, or a front shell and a rear shell, may be provided. The further features (for example for joining together) result analogously to the above explanations.

The above-mentioned object is solved according to aspect A in particular by a pram or pram frame, comprising a pusher bar for pushing the pram or pram frame and at least one force sensor device, in particular for detecting a direction and/or an amount of a force and/or a force component acting on the pusher bar and/or for detecting a variable derived from this force or force component, in particular a change over time of the force or force component, wherein the at least one force sensor device is configured to detect a force (component) and/or a variable derived therefrom at least over a predominant part (preferably at least 80% or at least 90%) of a horizontal section of a pusher bar (extending in particular at least substantially horizontally, optionally at an angle of less than/equal to 30° or less than/equal to 10°), preferably directly, and/or is configured to measure a force (component) and/or variable derived therefrom in at least one, in particular curved and/or arcuate, transition section of the pusher bar between a or the horizontal section of the pusher bar and a connecting section of the pusher bar (extending in particular from top to bottom, preferably obliquely, and/or ending at a main body of the pram (frame), optionally hingedly attached), preferably directly.

Alternatively or additionally, the above-mentioned object is solved according to an aspect B in particular by a pram or pram frame, in particular according to aspect A, comprising a pusher bar for pushing the pram or pram frame, and at least one force sensor device, in particular for detecting a direction and/or an amount of a force and/or a force component acting on the pusher bar, and/or for detecting a variable derived from this force or force component, in particular a change over time of the force or force component, wherein the at least one force sensor device extends at least over a predominant part (preferably at least 80% or at least 90%) of a (in particular at least substantially horizontally extending, possibly at an angle of less than/equal to 30° or less than/equal to 10°) horizontal section of the pusher bar, and/or extends at least in sections over at least one, in particular curved and/or arcuate, transition section of the pusher bar between a/the horizontal section of the pusher bar and a connecting section of the pusher bar (extending in particular from top to bottom, preferably obliquely, and/or ending at a main body of the pram (frame), optionally hingedly attached), preferably directly.

Alternatively or additionally, the above-mentioned object is solved according to an aspect C in particular by a pram or pram frame, in particular according to at least one of aspects A or B, comprising a pusher bar for pushing the pram or pram frame, and at least one force sensor device, in particular for detecting a direction and/or an amount of a force and/or a force component acting on the pusher bar, and/or for detecting a variable derived from this force or force component, in particular a change over time of the force or force component, wherein the force sensor device comprises:

- a base part, which is preferably designed to at least partially accommodate at least one sensor unit (sensor): and
- a sheathing part, which sheaths the base part and optionally the at least one sensor unit at least partially, preferably in a handle area of the pusher bar, and which is optionally connected, in particular fixedly, to the at least one sensor unit; wherein the sheathing part is movable, in particular displaceable, with respect to the base part, wherein there is optionally an intermediate space between the base part and the sheathing part, and
- wherein the at least one sensor unit is designed to detect a movement, in particular displacement, between the sheathing part and the base part.

Preferably, at least one motor, in particular an electric motor, is provided to assist in driving the pram or pram frame.

Preferably, at least one control device is provided, which is preferably in operative connection with the at least one force sensor device, in particular in such a way that an output of the at least one sensor device can be used to control the at least one motor.

Preferably, the control device is designed to control and/or regulate the output of the at least one motor, in particular depending on the output of the at least one sensor device, for example in discrete steps and/or continuously. Alternatively or additionally, the control device is designed such that at least one motor is started when a first threshold of the force and/or force component and/or the quantity derived therefrom is exceeded. Alternatively or additionally, the control device is designed in such a way that at least one motor is stopped or kept at constant power when a second threshold of the force and/or force component and/or the variable derived therefrom is exceeded.

Preferably, the sensor device comprises at least two sensor units (sensors), which preferably interconnect at least in sections via a connecting section each and/or extend adjacent to opposite ends of the horizontal section and/or extend (beyond) these ends.

Preferably, the sensor device comprises at least or exactly two (in each case single-piece or multi-piece) parts (a first and a second part or, in accordance with the embodiment, the sheathing part and the base part) that are movable relative to one another, in particular displaceable, and at least one sensor unit (sensor) that measures the relative movement (or relative displacement), in particular an amount of the relative movement (relative displacement).

Preferably, the first part (according to embodiment, the sheathing part) and the second part (according to embodiment, the base part) are movable, in particular displaceable, with respect to each other in (at least substantially) a radial direction and/or (at least substantially) in a direction lying in a plane spanned by a forward direction (when travelling straight ahead) and a/the vertical.

Preferably, the first part (according to embodiment, the sheathing part) and/or the second part (according to embodiment, the base part) is/are firmly connected to at least one sensor unit.

Preferably, at least one sensor unit (the at least one sensor unit) is configured to (measure) an electrical resistance or an electrical resistance change. Alternatively or additionally, at least one sensor unit (the at least one sensor unit) has at least one, optionally two, three, four or more strain gauges (which are preferably arranged in the horizontal section and/or transition section). Alternatively or additionally, at least one sensor unit (the at least one sensor unit) is configured as a bending beam sensor, wherein preferably a torque exerted on a measuring body acts on at least one, e.g. four, strain gauges, wherein for example one or two strain gauges are stretched and two strain gauges are compressed, wherein further preferably four strain gauges are built up in a bridge circuit to measure resistance changes from the strain gauges.

According to the embodiment, the base part has a straight section and at least one, in particular exactly one or exactly two curved sections.

The base part can be designed as a solid or preferably as a hollow section, optionally with a polygonal (especially square), e.g. D-shaped, oval or round cross-section.

The sheathing part may have a straight section and at least one, in particular exactly one or exactly two curved sections.

The sheathing part can be designed as a solid or preferably as a hollow profile, optionally with a polygonal (especially square), e.g. D-shaped, oval or round cross-section.

The base profile can be designed as a single piece (optionally monolithic).

The sheathing part can be made up of several pieces, in particular two, three, four, five or even more pieces (in particular, it can be made up of a correspondingly large number of individual parts, each of which may optionally be monolithic in itself).

The sheathing part can be constructed at least in sections, in particular in a/the transition section by two half-shells.

The sheathing part can surround the base part (at least (axially) in sections) over an angular range of at least 180° or at least 270° or at least substantially completely.

The above object is further preferably solved by a method for controlling a pram or pram frame, in particular as described above and below, wherein a force (component) acting on the pusher bar is measured, in particular a direction and/or an amount of a force and/or a force component acting on a pusher bar, and/or a variable derived from this force or force component, in particular a change in the force or force component over time, is detected. Insofar as functional features of the pram frame or pram are described above and below, these are to be understood in such a way that a corresponding method step can be carried out. In this respect, in terms of the method, the corresponding device features (such as, for example, force sensor device) are not necessarily decisive, but the method steps as such (i.e., for example, the detection of a direction and/or an amount of a force). It is understood that corresponding device features (such as a force sensor device), as described above and below, can also be present within the method.

Further embodiments are apparent from the subclaims.

In the following section up to the brief description of the figures, further preferred features of the invention are described. If a feature is not shown as optional in this section, this applies only to the disclosure of this section itself. In particular, this does not (necessarily) mean that the respective feature is in general essential or mandatory for the present invention as explained in particular in the claims and further above. Statements which hereinafter relate to the pram frame are also intended to apply to the pram. Thus, for example, if it is mentioned that the pram frame has a motor, it is also intended to disclose that the pram has a motor.

In particular, a pram frame is proposed comprising at least one motor, in particular an electric motor, for driving the pram frame, at least one pusher bar for pushing the pram frame, and preferably at least one sensor device, in particular a force sensor device. Preferably, the sensor device, in particular force sensor device, is designed to detect a direction and/or an amount of a force and/or a force component acting on the pusher bar and/or to detect a variable derived from this force or force component, in particular a change in the force or force component over time.

In an optional aspect, a force sensing device is provided that senses either the direction or amount (or both) of a force and/or a force component (or a quantity derived from that force or force component). This enables appropriate control to be performed based on the output of the sensor device. Output of a sensor device means in particular the output of a measured value and/or the output of an average value from several measured values.

Control can then be performed internally (by a control device provided on or in the pram frame) and/or externally by a separate control device (such as a mobile terminal, in particular a smartphone). However, it is first of all important that corresponding data concerning the force or variables related to the force can be generated at all. In this respect, it is advantageous, but not absolutely necessary, that the pram frame (or the corresponding pram) itself has a control device. Overall, a user-friendly and easy-to-manufacture motor-assisted pram frame is proposed.

The pusher bar is preferably designed as a single piece (optionally with individual parts that can be moved against each other). In particular, the pusher bar can have a horizontal handle. Alternatively, the pusher bar can also be designed in several pieces (e.g. in two pieces), for example with several handles separated from each other.

With the force sensor device, in particular at least two different force directions (for example, forward and backward and/or upward and downward) can be detected and, optionally, determined with respect to their amount, or at least four directions (for example, forward, backward, upward and downward) can be detected and, optionally, determined with respect to their amount.

Optionally, at least two different amounts (>0), preferably at least four different amounts, for example a continuum of amounts of the force (or force component or quantity derived therefrom) can be detected with the force sensor device. In any case, such a force sensor device provides information in a simple manner which can be advantageously used to control the motor for driving the pram or the pram frame.

Preferably, the pram frame or the pram has several motors, in particular electric motors, for driving the pram frame. Preferably, at least two or exactly two wheels (for example, a left and a right wheel or a first lateral wheel and a second lateral wheel) are each assigned a motor. Preferably, a control device may be provided for individually controlling the motors. Alternatively or additionally, a sensor device for detecting a pushing force and/or movement of the pram frame may be provided. By means of several (in particular at least or exactly two) motors, the pushing comfort can be improved, in particular during cornering, without having to take elaborate measures for this purpose (as, for example, in the case of only one motor with a differential gear).

Unless otherwise specified, pushing or pushing force shall be understood to mean, in particular, actions or forces that can be directed both forward and backward (even if the latter can also be referred to as pulling or pulling force).

Insofar as (two) forces are compared and it is stated that the (two) forces are equal or different, this is generally to be understood as an abbreviation for “equal or different with respect to the direction and/or magnitude of the forces”—unless it follows from the context that the direction is given (as, for example, in the case of a “backward force”); then a statement about equal or different forces is to refer to the magnitudes of the forces.

The at least one (force) sensor device can be arranged on and/or in the pusher bar, in particular a handle of the pusher bar, and/or be arranged in and/or near a pusher bar attachment area. A pusher bar attachment area means, in particular, an area where the pusher bar is attached to a main body of the pram frame. An arrangement close to the pusher bar attachment area means, in particular, an arrangement at a distance of less than 10 cm, preferably less than 5 cm, relative to the pusher bar (wherein, in the case of a relatively moving pusher bar, the minimum distance is meant here in particular).

Preferably, at least one control device is provided which is in operative connection with the at least one (force) sensor device, in particular in such a way that an output of the at least one sensor is used to control the at least one motor. In this way, a simple and reliable detection of the force (or other variable, such as the current movement) can take place.

In one embodiment, the at least one sensor device is designed to detect forces and/or force components acting on the pusher bar and/or variables derived therefrom at least two different locations. In particular, this detection can take place at a first (e.g. left) and a second (e.g. right) side of the pusher bar, in particular a first (e.g. left) and a second (e.g. right) side of a handle and/or at two different, in particular in each case laterally arranged, handles. Insofar as reference is made here and in the following to a left or right side, this refers in particular to a left or right side, respectively, which results from the viewing direction of the person operating the pram frame or the pram.

In a specific embodiment, the sensor device is designed to determine force components in the direction of movement and/or against the direction of movement (horizontally in each case) and/or upwards and/or downwards (vertically in each case). Alternatively or additionally, corresponding components of a time derivative (or a change over time) can be determined.

If acting forces (and/or force components and/or force-dissipating variables) are detected at several different locations, the control device can be designed in such a way that the corresponding drive wheels (or, optionally, associated motors) are actuated, for example depending on the magnitude and duration of the (in particular horizontal) acting forces (and/or their changes over time) and/or depending on whether the (in particular horizontal) forces (and/or their changes over time) point in the same direction. A drive wheel (or correspondingly associated motor) can be controlled depending on the force applied to its side (and/or the temporal change of this force) and/or on the force (and/or its temporal change) applied to the other (opposite) side.

The control device is preferably configured to control and/or regulate the output of the at least one motor, in particular based on the output of the at least one sensor device, for example in discrete steps and/or continuously.

Furthermore, the control device can be designed in such a way that at least one motor is started when a first threshold of the force and/or force component and/or variable derived therefrom is exceeded. By starting the motor, it is to be understood in particular that the motor provides power for driving the pram frame. In this sense, switching on the motor (which is then running at idle speed, for example) is not yet starting. However, starting may also mean switching on the motor (power supply) for the first time.

The control device can be designed in such a way that at least one motor is stopped or kept at constant power when a second threshold of the force and/or force component (for example an upward or downward component) and/or the variable derived therefrom is exceeded. Stopping the motor means, in particular, putting the motor into a state in which it no longer drives the pram. Optionally, the motor can still continue to run (for example, at idle). However, it can also be understood as a final switch-off (for example, an energy interruption to supply the motor). The second threshold can be greater in amount than the first threshold.

Furthermore, the control device can be designed in such a way that at least one motor is stopped when a threshold $F_d$ of a downward-acting force is exceeded and/or when a threshold $F_u$ of an upward-acting force is exceeded, wherein $F_d$ and $F_u$ are optionally identical or different (in terms of amount), and/or when a threshold $F_{f2}$ of a forward-acting force is exceeded, and/or when a threshold $F_{r2}$ of a rearward-acting force is exceeded, wherein $F_{f2}$ and $F_{r2}$ are optionally the same or different (in terms of amount), or is kept at a constant power, wherein $F_{f2}$ and/or $F_{r2}$ are preferably greater, in particular being 2 times or 5 times or 20 times as great as/as $F_u$ and/or $F_d$. Preferably, the control device is designed in such a way that the motor is started (again) when the power falls below (when previously exceeded) $F_{f2}$, $F_{r2}$, $F_u$ and $F_d$, respectively.

The control function can furthermore be designed in such a way that at least one motor is started when a threshold $F_{f1}$ of a forward-acting force is exceeded and/or when a threshold $F_{r1}$ of a backward-acting force is exceeded, wherein $F_{f1}$ and $F_{r1}$ are optionally identical or different (in terms of amount) (and/or optionally when a threshold of a downward-acting force is exceeded and/or when a threshold of an upward-acting force is exceeded, wherein the threshold of the downward-acting force and the threshold of the upward-acting force are optionally identical or different), wherein preferably $F_{f1}$ is smaller (in terms of amount) than $F_{f2}$ and/or preferably $F_{r1}$ is smaller (in terms of amount) than $F_{r2}$.

Alternatively or additionally, the control means may be configured such that when a (horizontal) force on one of the two sides is positive and a (horizontal) force on the other side is negative (which may correspond to a rotation or curve of the pram) and/or when a temporal change of the (horizontal) force on one side is positive and a temporal change of the (horizontal) force on the other side is negative (resulting in a rotation or curve of the pram), the drive wheels (or correspondingly associated motors) are controlled such that only one of the drive wheels (motors) provides assistance and/or so that the assistance force does not exceed a predetermined value or that the assistance of both motors is (completely) stopped or at least significantly reduced.

The pram frame preferably has at least one speed sensor and/or at least one cornering sensor. In particular, the speed sensor is designed in such a way that an amount (and optionally a direction) of a current speed (of the pram frame relative to a ground) can be determined. The cornering sensor is preferably configured such that a curvature of a turn or curve (in the path traveled by the pram frame) can be detected. The control device can then, optionally, be designed in such a way that the assistance of the corresponding motor is stopped when a certain speed is exceeded and/or a certain curve curvature is not reached. This improves overall reliability and safety in the operation of the pram.

The control device can be designed in such a way that a quotient of a pushing force or a (in particular horizontal) pushing force component and an assisting force of the at least one motor is constant, e.g. it is 1 or greater than 1 or greater than 2 or greater than 3 or less than 1, or is variable, e.g. in such a way that the assisting force increases more or less than linearly with the pushing force or the (in particular horizontal) pushing force component. For example, the assisting force may increase polynomially or exponentially or logarithmically with the pushing force.

Furthermore, the control device can be designed in such a way that a quotient of a temporal change of the pushing force or a temporal change of a (in particular horizontal) pushing force component and a temporal change of the assisting force of the at least one motor is constant, e.g. it is 1 or greater than 1 or greater than 2 or greater than 3 or less than 1, or is variable, e.g. in such a way that the temporal change of the assisting force increases more or less than linearly with the temporal change of the pushing force or the pushing force component. For example, the temporal change in the assisting force may increase polynomially or exponentially or logarithmically, etc., with the temporal change in the pushing force or the temporal change in the pushing force component.

Particularly preferably, the assisting force (or the temporal change of the assisting force) increases more than (only) linearly with the pushing force or pushing force component (or with the temporal change of the pushing force or temporal change of the pushing force component).

The thresholds and limits described above (and below) may have a predetermined fixed value or may be changed, for example by a self-learning algorithm.

Preferably, the control device is designed in such a way that the drive power of the at least one motor is throttled or stopped when a brake, in particular a deceleration brake (service brake) or parking brake, is actuated.

Preferably, the pusher bar and/or a section of the pusher bar (in particular that section of the pusher bar which at least partially comprises the sensor device) is movable over a range of motion, preferably freely, in particular without having to perform a disengagement, preferably against a restoring force.

The movement in this sense is in particular not to be understood as a movement for (pure) height adjustment of the pusher bar in order to adapt the pram frame to the height of the person operating it, but in particular as a (free) movement which can in particular serve to measure the force and/or can serve as feedback for the user that a motor assistance is acting. In this respect, a "double feedback" can be present here, on the one hand by the acting assistance of the motor (which can be recognized as such by the user) and at the same time the movement of the pusher bar (or pusher bar section). Thus, by one and the same movement, in particular a force measurement can take place and at the same time a double-feedback function can be realized. If this is compared, for example, with a piezo sensor (as a comparatively compact sensor device), comparatively good feedback is provided to the user in the present case, which makes it easier for the user to operate the pram (and the user does not have to rely solely on recognizing the motor assistance as such, which may optionally be comparatively small).

The (free) movement of the pusher bar (or pusher bar section) can be, for example, at least 2 mm or at least 10 mm or at least 20 mm. Comparing such a force sensor device with, for example, a simple piezo sensor, a significant improvement is achieved, as more precise information can be provided. A piezo sensor can only detect comparatively small relative movements (well below 1 mm).

In the case of translational movement, this means in particular the path of movement; in the case of rotational movement or pivoting, this means the path of a point of the pivoted section that traverses the greatest path of all points. In one embodiment, the pusher bar or an upper section of the pusher bar (e.g., handle) may be pivotable about a fastening region. Alternatively (or additionally), an (upper) section of the pusher bar may be translationally displaceable relative to a lower section. Furthermore, the entire pusher bar can be (translationally) displaceable.

The at least one sensor device can be designed to record a (temporal) progression of the force (or force component) and/or the variable derived therefrom. This can further improve the control system. For example, it may then be possible to define threshold values for forces (or force components) and/or their changes over time as well as threshold values for a time, wherein the threshold value for the time may be a duration of an (applied) force (or force component) and/or its change over time in which the threshold value(s) of the force (or force component) and/or its change over time is (are) exceeded (or fallen below).

A temporal change can basically be understood as the time derivative of the force (or force component) (in the mathematical sense). However, a temporal change can also be understood as $\Delta F/\Delta t$ (with finite non-infinitesimal $\Delta t$ in the range of, for example, 100 milliseconds to 1 second).

The respective control device is preferably a regulating device, in particular a regulating device for continuous (possibly linear) regulation of the power of the at least one motor, preferably a PID regulating device (wherein PID stands for proportional integral derivative).

Preferably, at least one braking device, in particular deceleration braking device and/or parking braking device, is provided. The deceleration braking device is preferably designed to use kinetic energy of the pram frame or pram (with child) for braking (and in particular to convert it into electrical energy). Alternatively or additionally, a/the control device may be provided and configured such that the parking braking device is automatically activated after a predetermined time, preferably between 3 seconds and 5 minutes (preferably between 10 seconds and 30 seconds), after a (complete) standstill of the pram frame (after previous movement). Alternatively or additionally, a/the control device can be provided and designed in such a way that the parking braking device is automatically activated after reaching a standstill or a comparatively low speed after previous movement.

The braking device can be designed in particular in two stages, preferably in such a way that there is both a deceleration brake (service brake) and a parking brake for locking a parking position (when the pram is completely stopped). The deceleration brake may be such that the pram is braked by friction (on one or more wheels) (converting kinetic energy into heat). Preferably, however, at least one motor can be used as a generator to decelerate the pram (converting kinetic energy into electrical energy, which in turn can be used to charge one or more batteries). Any actuating device may be provided for the deceleration brake, such as a hand-operable or finger-operable lever (on the pusher bar or handle) or other device (for example, a rotary handle or foot pedal or the like). It is also optionally possible for a graphical user interface (e.g., display, especially touchscreen) to be connected to the pram and/or to have a receiver to be connectable to an external device (e.g., a smartphone with a corresponding app). The actuating device (or receiver) may be connected to the deceleration brake (by suitable means) to apply the deceleration brake, i.e., to apply the braking force desired by the user (which may be zero or greater than zero, in particular may take more than 2 or more than 5 different values greater than zero). The deceleration brake may act as long as the actuating device is actuated, or until the pram is completely stopped, at which point the parking brake may act.

The parking brake may be configured as a locking device that prevents one or more wheels from rotating. For example, the parking brake may include a pin that interacts with spokes or latching devices (e.g. grooves) provided in a side surface of the wheel.

The parking brake may optionally (automatically) be activated immediately after or after a predetermined time the pram frame or pram has been stopped, especially by the deceleration brake.

Preferably, the at least one parking braking device can be activated (only) electrically or electronically and released (only) manually.

The parking braking device can be pretensioned in a released state and not pretensioned or (only) slightly pretensioned in an activated state. These measures improve safety during operation.

The parking brake can be actuated in various ways, for example via a switch, e.g. slide switch or push switch or a foot pedal or the like.

In particular, if the parking brake is pretensioned in the activated state, release of the parking brake is (only) possible manually, whereas activation of the brake is (only) possible electronically or electrically.

A/the sensor device, in particular the force sensor device can be provided and the/a control device can be designed in such a way that at least one braking device, in particular the deceleration braking device and/or the parking braking device, is activated when a person operating the pram releases a contact, e.g. via the hand and the handle. Preferably, the deceleration brake is activated with increased (maximum) force and/or the parking brake is activated (emergency braking) if it is determined that the person operating the pram is not in contact (anymore) with the pram and the pram is nevertheless moving.

In one embodiment, the control device is designed in such a way that the braking device is activated when the force sensor device detects a force that is (at least partially) directed against the current direction of movement of the pram frame. Alternatively, in such a case, motor assistance may be provided as described above. Preferably, the motor is used as a current generator in the event of braking.

At least one display or signaling device can be provided to indicate to the user of the pram frame that motor assistance is or may be present. Optionally, a first display or signaling device can indicate that motor assistance is currently present, and a second display or signaling device can indicate that motor assistance may be present, in the sense that depending on further parameters (for example, a maximum speed or the like) either motor assistance is present or (if the parameters are appropriate) not.

Overall, the pram or pram frame of the present invention can provide comfortable assistance when pushing (or pulling) the pram. In particular, it is possible to set values $F_{f1}$ and/or $F_{r1}$ that (substantially) define those forces that (maximally) need to be applied by the user (regardless of the situation). Starting with a pram that is stationary, the user will start pushing (or pulling). As a result, the horizontal component of the pushing force or pulling force will become greater than zero. At the time $F_{f1}$ is reached, the motor can start to assist the user (with minimum power). For example, as the horizontal component of the pushing or pulling force continues to increase (i.e. $\Delta F_{inh}/\Delta t>0$) the assisting force will also increase (i.e. $\Delta F_s/\Delta t>0$). Thus, the horizontal component of the force can be kept (essentially) constant at $F_{f1}$ (at least if overshoot is not considered). Of course, if there is a condition to stop the motor assistance, a larger force may be necessary.

$F_u$ can be between 0 and 25 N, preferably between 5 N and 15 N.

$F_d$ can be between 10 N and 50 N, preferably between 20 N and 40 N.

$F_{f1}$ can be between 0 and 25 N, preferably between 5 N and 15 N. $F_{r1}$ can be between 0 and 25 N, preferably between 5 N and 15 N. $F_{f2}$ and/or $F_{r2}$ can be between 25 N and 500 N, preferably between 50 N and 200 N.

$F_{f1}$, $F_{r1}$, $F_{f2}$ and/or $F_{r2}$ can optionally be preset by the user, for example via an interface such as a graphical user interface and/or a smartphone (or smartphone app). Optionally, minimum and maximum values may be predefined (by the manufacturer) to avoid safety issues and/or to extend the useful life of a battery.

The invention is described below on the basis of exemplary embodiments, which are explained in more detail with reference to the figures, wherein.

In the following description, the same reference numbers are used for the same and similarly acting parts.

Figure 1:
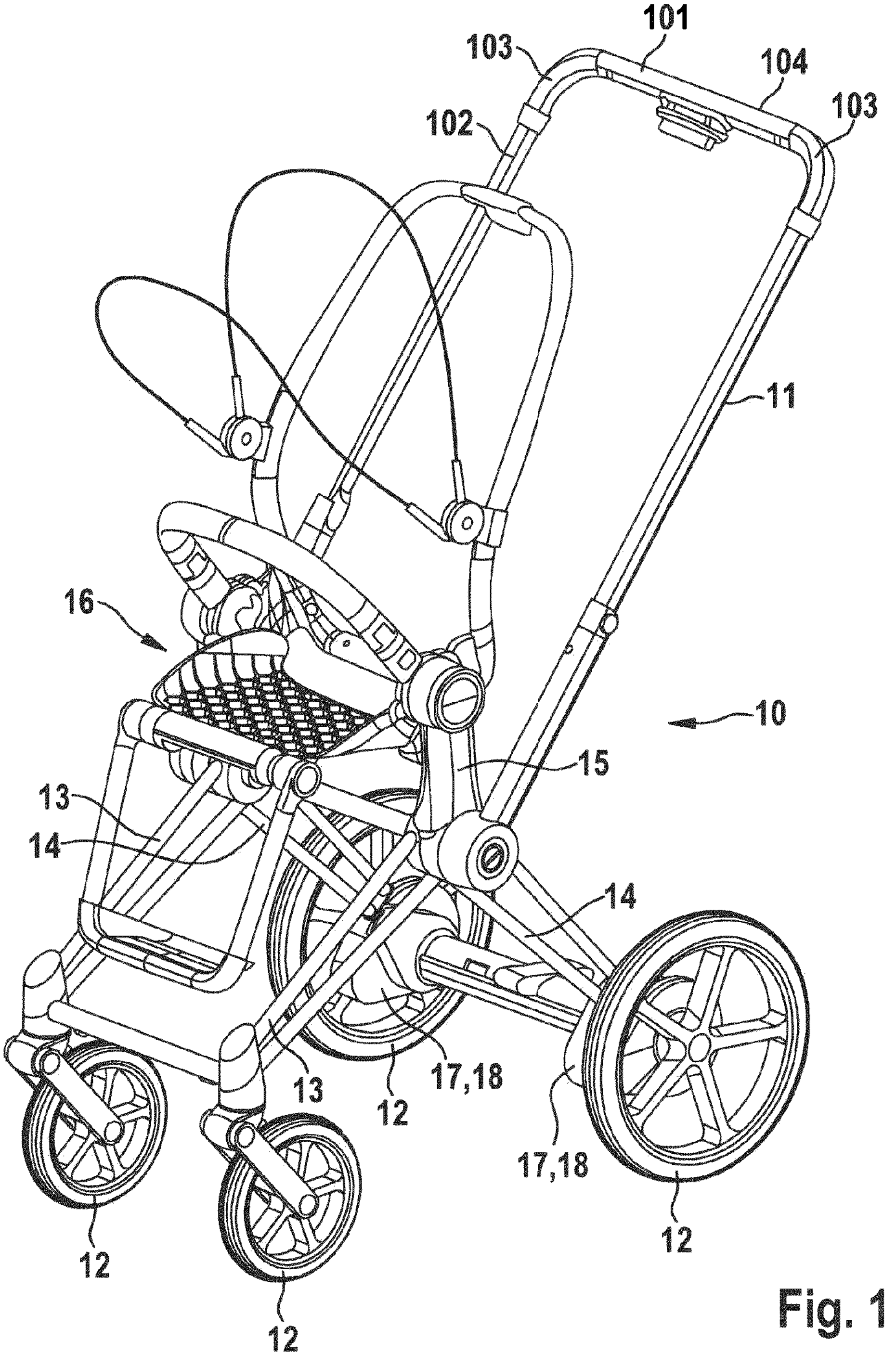
FIG. 1 shows a complete pram incl. attachment in perspective view, so that the pusher bar can be seen.

FIGS. 1 to 5 show a pram frame 10, a pusher bar 11, wheels 12, front wheel struts 13, rear wheel struts 14, an adapter 15, a child-receiving device 16, a motor 17, a control device 18, a horizontal section 101 of the pusher bar 11, a (respective) connecting section 102 of the pusher bar 11, a transition region 103 or transition section of the pusher bar 11, a handle area 104, an intermediate space 105 (see FIGS. 4 and 5) between a base part 110 and a sheathing part 120 of the handle area 104, an edge region 121, a recess 122, a rounding sheathing part 130, a first shell half 131 and a second shell half 132 of the rounding sheathing part 130, a first projection 133, screws 134, a second projection 135, a screw 136, an opening 137, an edge region 138, a third projection 139, a sensor unit 140, and a region 141 for at least one strain gauge. In the assembled state, the third projection 139 preferably engages a corresponding recess 122 of an edge region 121 of the sheathing part 120.

FIG. 1 shows a pram with a child-receiving device 16. The child-receiving device 16 is connected or connectable to the pram frame 10 via the adapter 15. The child-receiving device 16 has (in the present case) a leg section, a seat section and a backrest section. Alternatively, the child-receiving device 16 can also be designed without a leg section or without such a subdivision into different sections (for example as a reclining insert).

The pram frame 10 has a pusher bar 11, which in turn has a horizontal section 101 and has (two) connecting sections 102 connecting to the horizontal section 101 via a respective transition region 103. The horizontal section 101 is formed as a horizontal strut. The connecting sections 102 are formed as struts (in the state of use) extending obliquely downwardly (or forwardly) from the horizontal section 101 and can preferably be angled (in particular folded) and/or telescopically varied with respect to their length.

The pram according to FIG. 1 has four wheels. However, it is conceivable that more or fewer wheels are provided (for example three, in particular one front wheel and two rear wheels). Specifically, two rear wheels and two (rotatable, possibly lockable) front wheels are provided in FIG. 1. The respective pairs of wheels are connected to each other via connecting struts. The struts connecting the wheels are in turn connected to the connecting sections 102 (in particular in an articulated manner) via further struts—front wheel struts 13 and rear wheel struts 14, wherein a single strut may be sufficient for each wheel.

The transition sections 103 of the pusher bar 11 are curved and preferably form (at least approximately) a quarter circle and/or preferably include an angle of at least approximately 90°.

Horizontal section 101 and connecting sections 102 are formed extending (at least approximately) at right angles to each other.

The pusher bar 11, in particular its horizontal section 101 and its transition sections 103, are shown in further detail in FIGS. 2-5.

Figure 2:
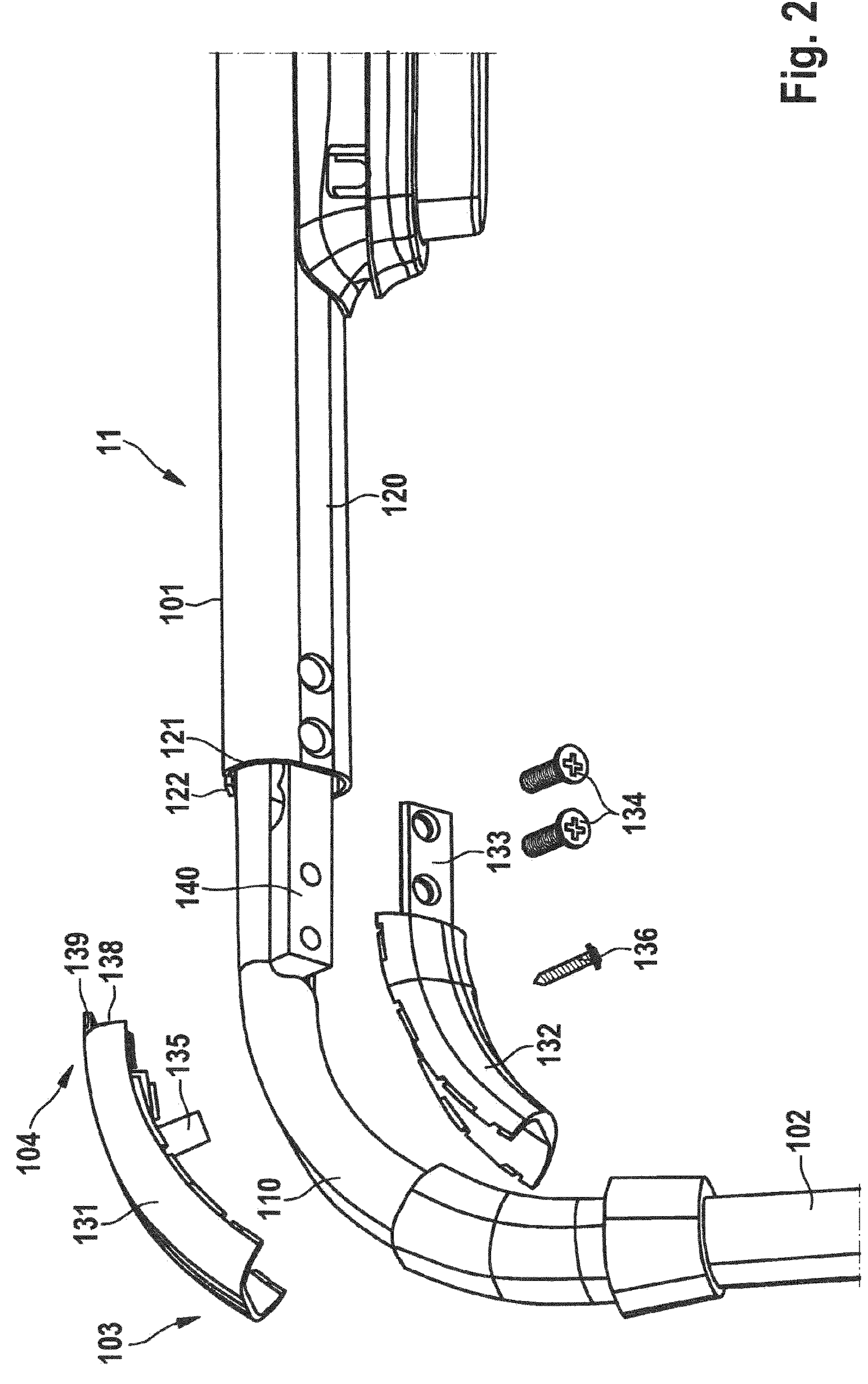
FIG. 2 shows an exploded view of upper pusher bar section with rounding sheathing part.

FIG. 2 shows a section of the handle area 104, including a section of the horizontal section 101 and one (of two) transition sections 103.

The sheathing part 120 is provided in the horizontal section 101. This is designed straight in shape. In the transition section 103, the rounding sheathing part 130 comprising the first shell half 131 and the second shell half 132 is arranged. The rounding sheathing part 130 (as well as its shell halves 131, 132) are curved. The rounding sheathing part 130 forms a (bent) sleeve. The sheathing part 120 forms a (straight) sleeve.

The sheathing part 120 and the rounding sheathing part 130 sheath the base part 110. The sheathing part 120 is shifted to the right relative to the base part 110 in FIG. 2, so that the sensor unit 140 located inside the sheathing part 120 and the rounding sheathing part 130 can be seen. In the assembled state, the two openings in the sheathing part 120 shown at the left end in FIG. 2 are in register with the recesses or openings or the screws 134 shown at the left end of the sensor unit 140 (see also FIGS. 3 and 4).

Figure 3:
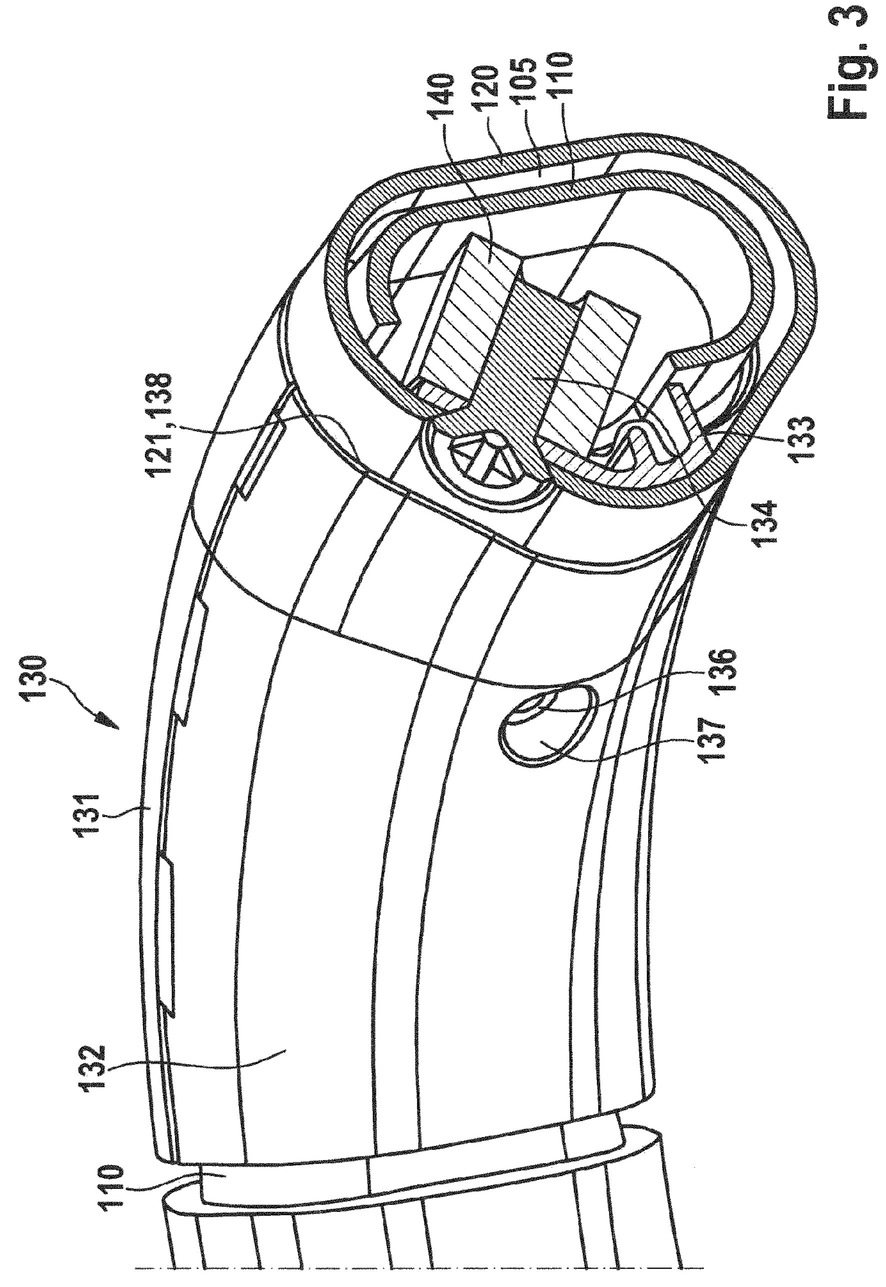
FIG. 3 shows a cross-section of the pusher bar perpendicular to the longitudinal extension of the horizontal section and through the sensor and the first projection of the rounding sheathing part attached to the sensor.
Figure 4:
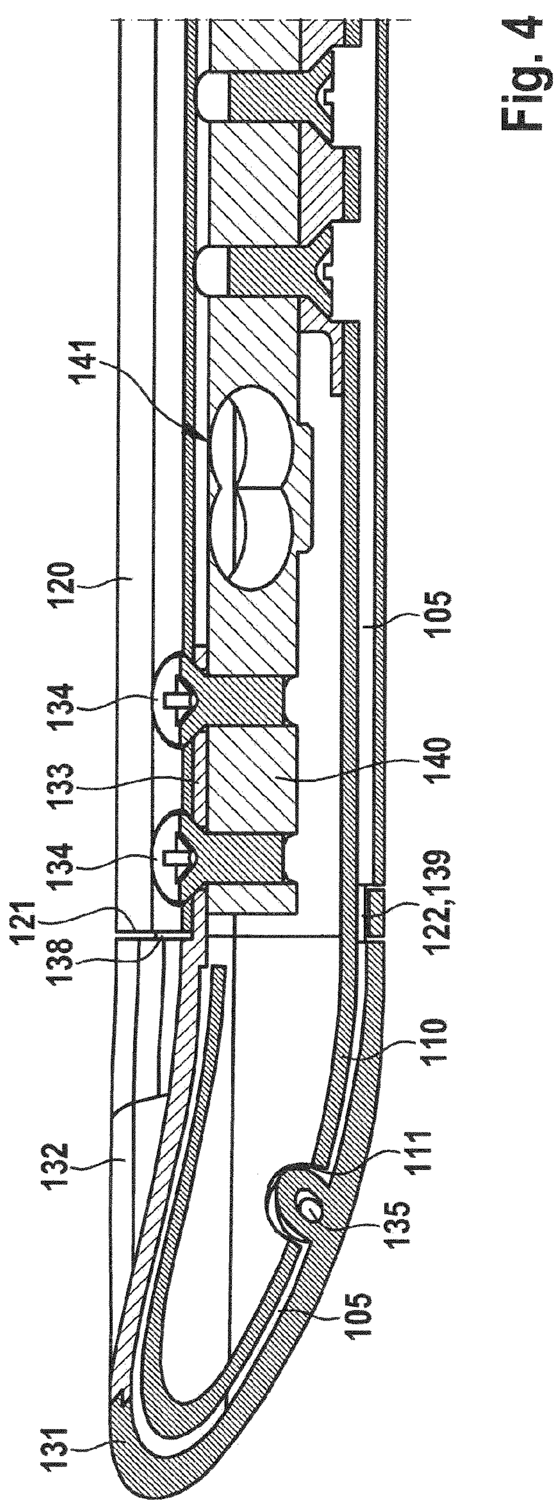
FIG. 4 shows a longitudinal section through the pusher bar (perpendicular to the horizontal) so that a sensor and a rounding sheathing are visible.
Figure 5:
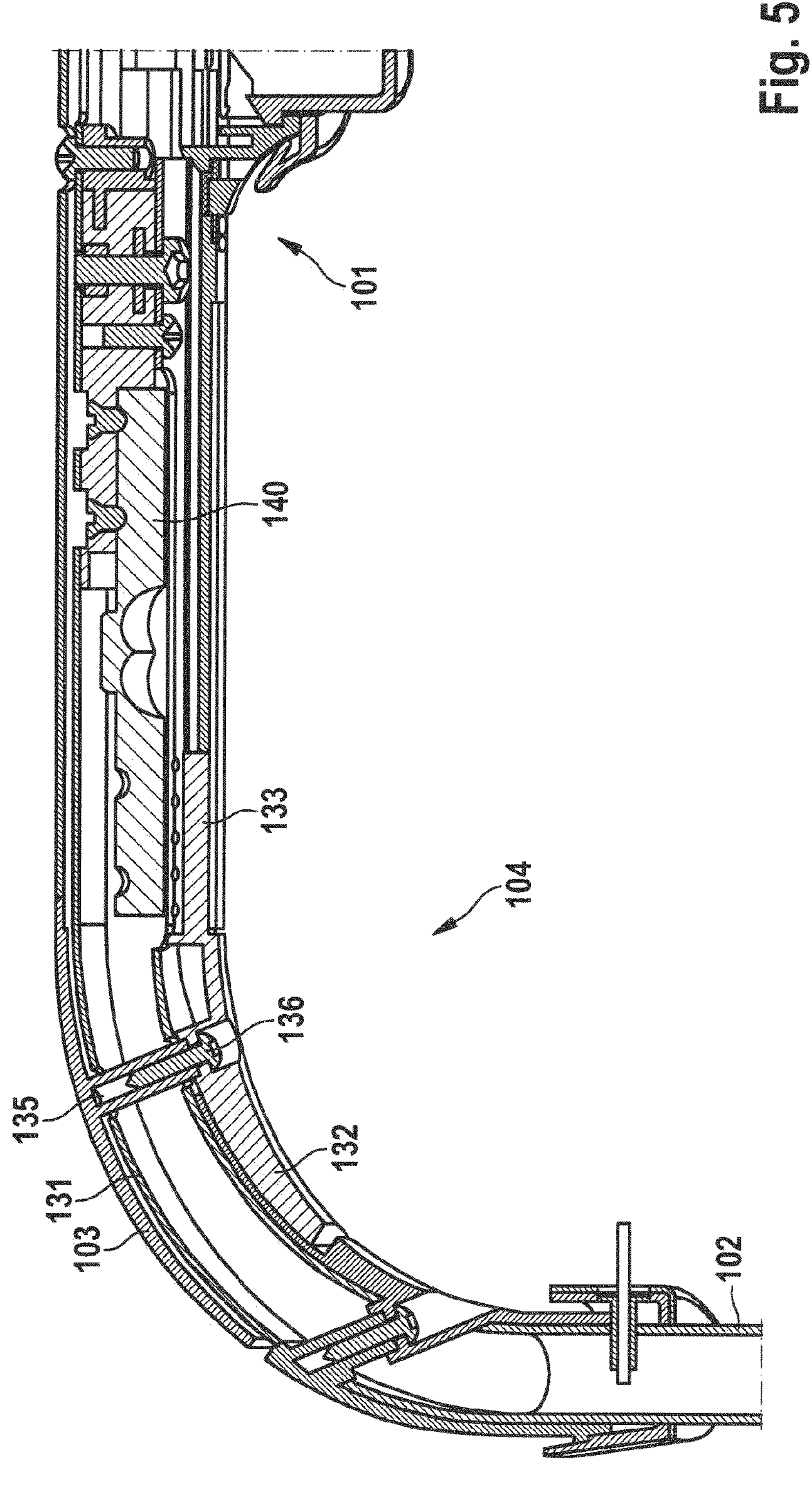
FIG. 5 shows a longitudinal section through the pusher bar (section in the pusher bar plane) so that a sensor and a rounding sheathing are visible.

As can also be seen in FIGS. 3 and 4, rounding sheathing part 130 or its half-shell 132, sheathing part 120 and sensor unit 140 are connected via the (here exemplarily two) screws 134. In general, another fastening means (in a different number, for example also one or more than two) may also be provided for this purpose.

The two half shells 131, 132 are in turn connected to each other via the second projection 135 (with internal thread) and the screw 136. Other fastening or connecting devices are also conceivable here. However, a detachable fastening is preferred.

An opening (channel 111) may be provided in the base part 110 that is (slightly) larger than the second projection 135 to prevent an unwanted connection between the rounding sheathing part 130 and the base part 110.

Specifically, the second shell half 132 includes a first projection 133 extending between the sheathing part 120 and the base part 110 and having two openings through which the screws 134 may be inserted.

The first projection 133 adjoins an edge region 138 of a main body of the second shell half 132 (see FIGS. 3 and 4), wherein the edge region 138 of the main body of the second shell half 132 additionally adjoins, preferably directly, in particular positively, an edge region 121 of the sheathing part 120.

An opening 137 is provided for passing the screw 136 through the second shell half 132 (see FIG. 3).

The first shell half 131 includes a third projection 139 (see FIG. 2) that is engageable with the sheathing part 120, particularly with a recess 122.

The sensor unit 140 can itself function according to the principle of a strain gauge and/or (see FIG. 4) have an area 141 in which a strain gauge (not shown in detail) can be arranged. If a pressure is now applied to the sheathing part 120 and/or the rounding sheathing part 130, the sensor unit 140 or an optional strain gauge 141 (or, as the case may be, several strain gauges) can be correspondingly stretched and/or compressed (due to the distance between the sensor unit 140 and the respective sheathing part 120 or rounding sheathing part 130, which is provided at least in sections). This stretching and/or compression can then be evaluated accordingly to determine whether sheathing part 120 and/or rounding sheathing part 130 has been gripped by a user.

For example, the sensor unit 140 may be configured to measure an electrical resistance or a change in electrical resistance. The sensor unit 140 may include at least one (optionally two, three, four, or more) strain gauges. The strain gauges may be disposed in the horizontal section and/or transition section. The sensor unit 140 may be configured as a bending beam sensor, preferably wherein a torque applied to a measuring body acts on at least one (e.g., four) strain gauges. For example, one or two strain gauges may be stretched and one or two strain gauges may be compressed. Specifically, four strain gauges may be constructed in a bridge circuit to measure resistance changes of the strain gauges.

Figure 6:
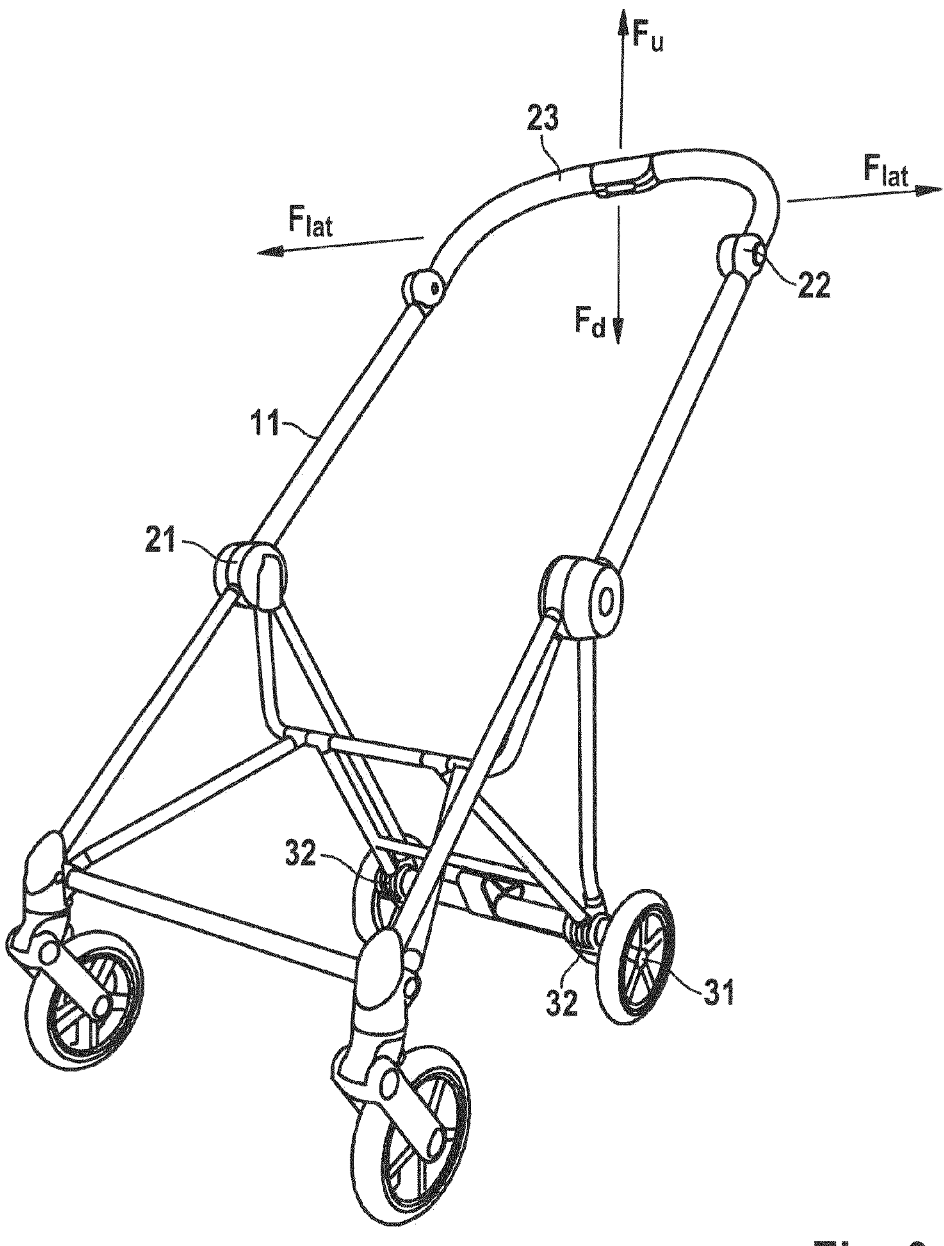
FIG. 6 shows a schematic oblique view of a pram frame according to the invention.

FIG. 6 shows a pram frame according to the invention in a schematic oblique view. The arrow $F_d$ indicates a downward force acting on a handle 23 (in the horizontal section). The arrow $F_u$ indicates an upwardly directed force acting on the handle 23. The arrows $F_{iat}$ indicate sideways directed forces. The handle 23 is pivotally mounted relative to a lower section of the pusher bar 11.

Specifically, the handle 23 can be pivoted (and engaged) in various positions to perform a height adjustment of the handle 23.

A pivotable bearing 22 (with corresponding joints) is provided between the pivoting handle 23 and the lower section of the pusher bar 11.

The (entire) pusher bar 11 is again preferably pivotally mounted on a pivotable bearing 21 on a main body of the pram frame (in particular, to allow the pram frame to be folded).

Figure 7:
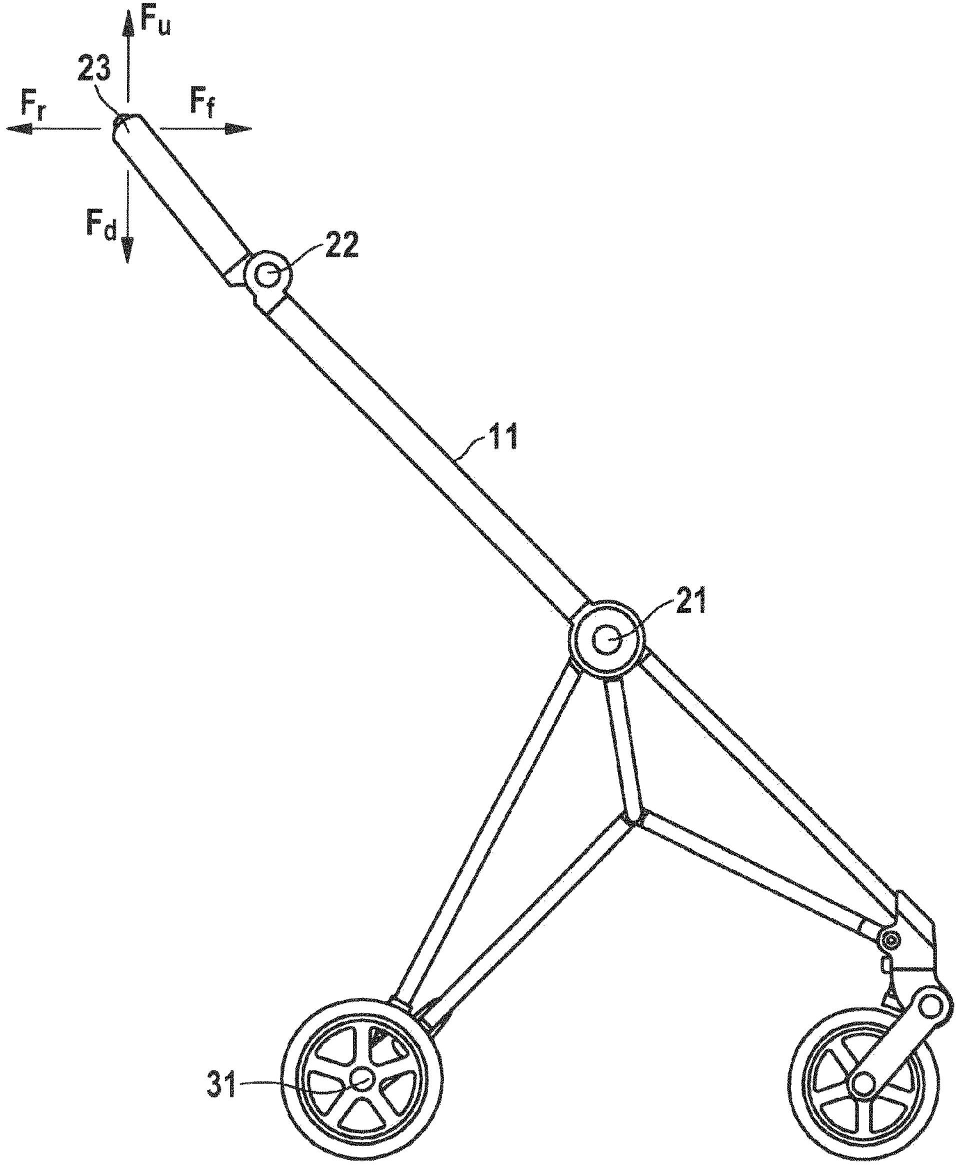
FIG. 7 shows a side view of the pram frame according to FIG. 6.

Alternatively or in addition to an arrangement of the sensor device according to FIGS. 1 to 5, a sensor device/sensor devices can be provided on the pivotable bearing 21 and/or on the pivotable bearing 21 in order to detect a force of a user (in particular $F_u$ and $F_d$) acting on the handle 23. Furthermore (see FIG. 7), a forwardly directed force $F_f$ as well as a backwardly directed force $F_r$ can preferably be detected with the respective sensor device. In wheel hubs 31, motors can preferably be placed (not shown in detail). Alternatively, motors can be placed on an axle 32 (in particular on sections of the axle that are adjacent to the wheel hub 31).

At this point it should be pointed out that all the parts described above, taken individually and in any combination, in particular the details shown in the drawings, are claimed to be essential to the invention. Modifications thereof are familiar to those skilled in the art.

LIST OF REFERENCE SIGNS

10 Pram frame
11 Pusher bar
12 Wheels
13 Front wheel struts
14 Rear wheel struts
15 Adapter
16 Child-receiving device

17 Motor
18 Control device
21 Pivotable bearing
22 Pivotable bearing
23 Handle
31 Wheel hub
32 Axle
101 Horizontal section
102 Connecting section
103 Transition region
104 Handle area
105 Intermediate space
110 Base part
111 Channel
120 Sheathing part
121 Edge region
122 Recess
130 Rounding sheathing part
131 First shell half
132 Second shell half
133 First projection
134 Screws
135 Second projection
136 Screw
137 Opening
138 Edge region
139 Third projection
140 Sensor unit
141 Region for strain gauges

The invention claimed is:

1. A pram or pram frame, comprising:

a pusher bar for pushing the pram or pram frame having a horizontal section, a transition section and a connecting section, wherein the transition section is between the horizontal section and the connecting section; and at least one force sensor device for detecting a direction or an amount of a force or a force component acting on the pusher bar or for detecting a variable derived from the force or the force component, wherein the pusher bar using the at least one force sensor device is designed to be sensitive over at least 80% of the horizontal section of the pusher bar, wherein the at least one force sensor device comprises at least one sensor unit arranged in the horizontal section, wherein the at least one force sensor device comprises a sheathing part at least partially sheathing the at least one sensor unit, and wherein the sheathing part has a straight section and at least one curved section, wherein the curved section extends into the transition section.

2. The pram or pram frame according to claim 1, wherein the at least one force sensor device comprises:

a base part, designed to at least partially accommodate at least one sensor unit;

wherein the sheathing part sheaths the base part at least partially in a handle area of the pusher bar, and which is connected to the at least one sensor unit, wherein the sheathing part is movable with respect to the base part, wherein an intermediate space is present between the base part and the sheathing part, and wherein the at least one sensor unit is designed to detect a movement between the sheathing part and the base part.

3. The pram or pram frame according to claim 2, wherein the base part has a straight section and has at least one curved section, and is designed as a solid or hollow profile with a polygonal or round cross section, or the sheathing part is designed as a solid or hollow profile with a polygonal or round cross-section, and a base profile is designed in one piece, or the sheathing part is formed from two or more pieces, each of which may be monolithic in itself, or the sheathing part is formed at least in sections in the transition section by two half shells or the sheathing part surrounds the base part, over an angular range of at least 180°.

4. The pram or pram frame according to claim 1, wherein at least one motor is provided for assisted driving of the pram or pram frame.

5. The pram or pram frame according to claim 4, wherein at least one control device is operatively connected to the at least one force sensor device, such that an output of the at least one force sensor device can be used to control the at least one motor.

6. The pram or pram frame according to claim 5, wherein the at least one control device is designed to control or regulate the output of the at least one motor as a function of the output of the at least one force sensor device in discrete steps or continuously, and is designed in such a way that at least one motor is started when a first threshold of the force or force component or the variable derived therefrom is exceeded, and designed in such a way that the at least one motor is stopped or kept at constant power when a second threshold of the force or force component or the variable derived therefrom is exceeded.

7. The pram or pram frame according to claim 1, wherein the at least one force sensor device comprises at least two sensor units, which extend at least in sections, wherein a first of the at least two sensor units is positioned adjacent or beyond a first end of the horizontal section and a second of the at least two sensor units is positioned adjacent or beyond a second end of the horizontal section such that the at least two sensor units extend to adjacent opposite ends of the horizontal section or extend beyond the opposite ends.

8. The pram or pram frame according to claim 1, wherein the at least one force sensor device comprises at least two parts which are movable relative to one another and at least one sensor unit which measures an amount of relative movement between the at least two parts.

9. The pram or pram frame according to claim 1, wherein a first part and a second part of the at least one force sensor device are movable relative to each other in at least substantially radial direction and at least substantially in a direction lying in a plane spanned by a forward direction and a vertical.

10. The pram or pram frame according to claim 1, wherein a first part and a second part of the at least one force sensor device are fixedly connected to at least one sensor unit.

11. The pram or pram frame according to claim 1, further comprising a second force sensor device configured to measure an electrical resistance or an electrical resistance change or comprises at least one strain gauge arranged in the transition section of the pusher bar.

12. The pram or pram frame according to claim 11, wherein the second force sensor device is configured as a bending beam sensor, wherein a torque exerted on a measuring body acts on the at least one strain gauge.

* * * * *